May 26, 1959 A. CLAAS 2,887,947
BALING MACHINES
Filed July 31, 1956 2 Sheets-Sheet 1
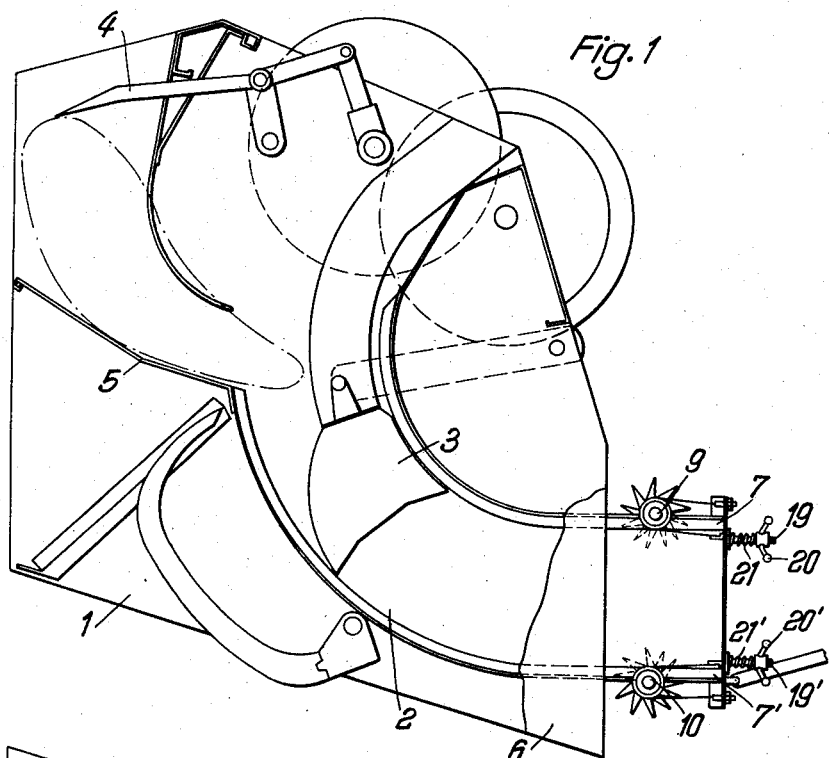
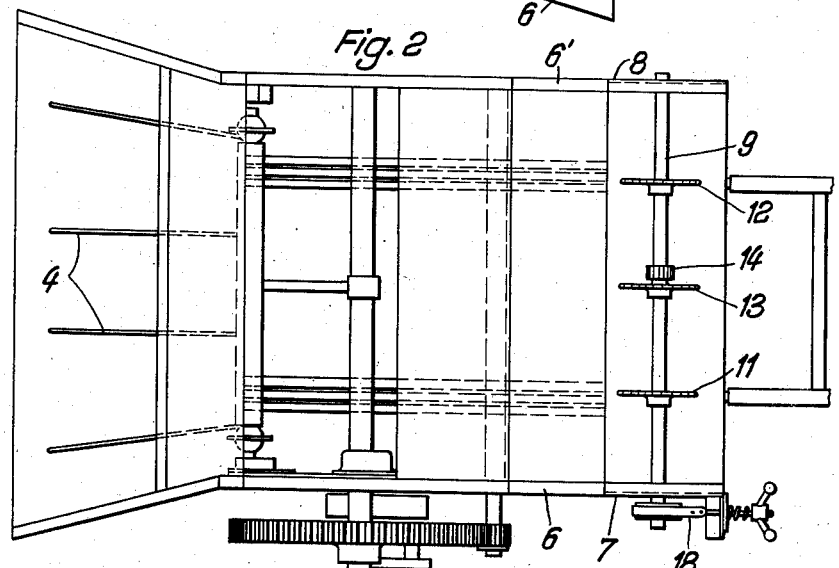
Inventor:
August Claas
BY
Richards & Geier
ATTORNEYS May 26, 1959     A. CLAAS     2,887,947
BALING MACHINES Filed July 31, 1956                           2 Sheets-Sheet 2

Inventor:
August Claas
by
Richards & Geier
ATTORNEYS

United States Patent Office 2,887,947
Patented May 26, 1959

2,887,947

BALING MACHINES

August Claas, Harsewinkel, Germany

Application July 31, 1956, Serial No. 601,216

1 Claim. (Cl. 100—179)

The invention relates to the baling chamber in baling machines for hay, straw and the like (hereinafter and in the claim referred to as "straw"), and in particular to the provision at the exit end of the baling chamber of a braking device to control the movement of the bales.

The practice is known of arranging at the outlet or exit end of the baling chamber a device comprising a plurality of spring arms adjustable by tension screws and acting upon the upper face of the bales for the purpose of constricting the outlet point of the baling chamber in order to exert a greater or lesser pressure on the bales. Furthermore, it has also been proposed, for the purpose of influencing the form of bales in strawpresses, to provide a pressure device acting upon the upper surface of the bales and co-operating with the ejection chute, which pressure device is mounted in the baling chamber at exit, is adjustable vertically, and has pressure means in the form of press-rollers, tubes or curved arms. Such devices for constricting the outlet end of the baling chamber have proved particularly disadvantageous however when moist material is fed into the press. The material accumulates solidly on the walls of the chamber and, especially when, after interruptions in the operation, the tension devices located at the outlet from the channel are not relaxed, difficulties are encountered which generally involve damage to the press due to increased friction of the moist material. These previously known or proposed devices have this embodied additional pressing means which supplement the operation of the baling plunger in a direction substantially at right angles to that of operation of the plunger. In baling machines heretofore known or proposed, the feeder member does not distribute the material uniformly over the cross-section of the baling chamber, and, since the material is denser in the lower part of the chamber than in the upper part, the bales receiver stronger pressure on the lower face than on the upper face. As the bales leave the chamber, therefore, a hollow is found in the upper face of each bale, and as the bale is drawn tight it becomes round in form and the binding is consequently loose.

An object of the present invention is to obviate or mitigate the aforementioned disadvantages.

The invention provides, in or for a baling machine for straw, a baling chamber having at the exit end thereof a braking device for the straw comprising wheels adapted to engage the straw and to be braked in order to control the movement of the straw.

The pressing, and distribution of the material in the baling chamber is thus influenced by retarding the movement of the straw. Furthermore the braking device enables firm bales to be obtained even with a relatively short chamber.

It has been discovered that the counter-pressure required for the pressing operation can be more simply achieved by providing an upper and a lower brake shaft instead of elongating the baling chamber as heretofore. Moreover, the incidence of weak pressure at the upper surface of the bales can be prevented by a more vigorous braking of the lower brake shaft relative to the upper one.

Also in accordance with the invention a braking device for the bales is mounted at the exit end of the baling chamber, and comprises an upper and a lower brake shaft, each provided with spur wheels. On each brake shaft, extending over the breadth of the baling chamber, one or more, preferably two, spur-wheels are fitted, which preferably have conically-pointed teeth so that these wheels will penetrate as far as possible into the lower and upper faces of the bale. The spurwheels do not act as pressing means, but simply retard the movement of the bale by virtue of increased friction. Brake pulleys located on the outer extremity of each brake shaft carry a brake belt which can be tensioned by a tension device comprising a tension bolt and nut. Thus, if the lower shaft is braked relative to the upper shaft a greater resistance is offered to the forward motion of the bale on the lower face thereof than on the upper face, and consequently the material is more uniformly distributed over the baling chamber. In addition, the direction of the bale on leaving the baling chamber is thereby affected, the bale being now deflected downwardly. With equal braking on upper and lower shaft the bale travels straight forward, and with stronger braking on the upper shaft relative to the lower, the bale is upwardly inclined.

A further proposal in accordance with the invention is to arrange also on the upper shaft the straw-wheel located at the end of the baling chamber and which in known manner determines the size of the baled bundle. This arrangement eliminates the need of another shaft together with its bearings. In another embodiment of the tension device for braking the shafts, the two brake belts are tensioned simultaneously by one and the same tension screw and nut. Since the securing means for the tension screw can be displaced upwards or downwards from the centre position, the brake belt obtains a greater or lesser angle of lap and consequently a greater or lesser braking power. This provides a simple means of obtaining different braking effects on the lower and upper face of the bale.

An embodiment of the invention is illustrated diagrammatically by way of example in the accompanying drawings, in which:

Fig. 1 is a side view, partly in section, of a straw baler with a braking device mounted thereon;

Fig. 2 is a plan view of Fig. 1;

Figure 3:
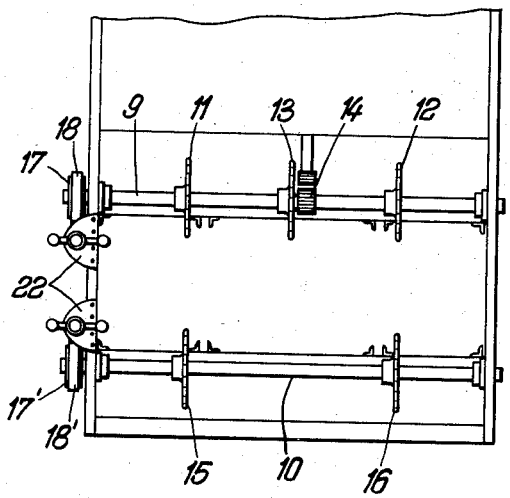
Fig. 3 is a rear elevation of the baling chamber and the brake arrangement.

Referring to the drawings, the baler or press 1 comprises essentially the baling chamber 2, the plunger 3 and feeder or packer arms 4 which convey the material over the feed plate 5 to the plunger. A bale-guide arrangement comprising angle-irons 7, 7' and 8 and carrying bearings for shafts 9 and 10 is mounted as an extension to the chamber walls 6, 6' at the end of the press. Brake wheels 11 and 12 and also the straw-wheel 13 with regulating or release lifting cog 14 for adjusting the size of bale are mounted on the upper brake shaft 9. The lower brake shaft 10 carries brake wheels 15 and 16. Brake pulley 17 and 17' over which pass brake belts 18 and 18' are provided, one at the outer extremity of each brake shaft. Each brake belt is connected to a tension screw 19 or 19' and is tensioned by a wing-nut 20 or 20'. A resilient braking effect is obtained on the brake shafts by means of the springs 21 and 21' located between the wing-nuts and supports.

Figure 4:
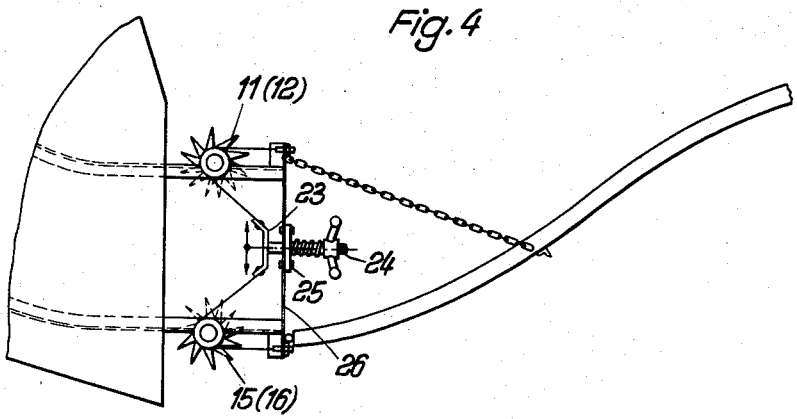
Fig. 4 is a side view of a modified form of tension device for controlling the brake pulleys.

In the embodiment shown in Figs. 1 to 3 each brake shaft can be braked individually. It is also possible, however, as shown in Fig. 4, to regulate both brake bands simultaneously with a single tension nut and screw. For this purpose the extremities of the brake belts are made fast to a flanged plate 23 affixed to the tension screw 24. Since the support 25 for the tension device can be displaced upwards or downwards from the mean position on the support 26, a differential braking power can be applied to the two brake shafts, whereby the bales may be directed upwards or downwards.

A feature of the present invention, however, is that no additional or supplementary pressing means is required. The baling plunger provides the pressing action. The brakes operate as an opposing means, which exert by friction, a retarding action which builds up an opposing pressure to the plunger.

I claim:

A baler, comprising means forming a curved baling chamber having an inlet and an outlet, a feed plate located outside of said baling chamber close to the inlet thereof, a plunger, means supporting said plunger for swingable back-and-forth movement within said chamber, feeder arms located close to said inlet for conveying straw over said feed plate to said plunger, angle iron means connected with the first-mentioned means and located outside of said chamber close to the outlet thereof, an upper brake shaft carried by said angle iron means and located outside of and close to the upper end of said outlet, a lower brake shaft carried by said angle iron means and located outside of and close to the lower end of said outlet, brake wheels carried by said shafts, said brake wheels extending into the path of a bale emerging out of said outlet, a straw wheel carried by said upper brake shaft, a regulating cog connected with said straw wheel for adjusting the size of the bale, a brake pulley carried by said upper brake shaft at one end thereof, another brake pulley carried by said lower brake shaft at one end thereof, a brake belt extending over the first-mentioned brake pulley, another brake belt extending over said other pulley, separate tension screws connected with the two brake belts, and separate resilient tensioning means connected with the two tension screws for varying the braking effect of the upper and lower brake shafts and the brake wheels carried thereby.

References Cited in the file of this patent

UNITED STATES PATENTS

| | | |
|---|---|---|
| 358,898 | Sooy | Mar. 8, 1887 |
| 375,078 | Livengood | Dec. 20, 1887 |
| 551,771 | Keith | Dec. 24, 1895 |
| 668,129 | Kerns | Feb. 12, 1901 |
| 1,258,848 | Zachow | Mar. 12, 1918 |
| 2,686,467 | Nolt | Aug. 17, 1954 |
| 2,778,295 | Luek | Jan. 22, 1957 |

FOREIGN PATENTS

| | | |
|---|---|---|
| 1,054,522 | France | Oct. 7, 1953 |